Feb. 18, 1964 L. J. WEYMOUTH 3,121,491
APPARATUS FOR HANDLING FOIL TYPE STRAIN GAGES
Filed April 7, 1961
FIG. 1
FIG. 2
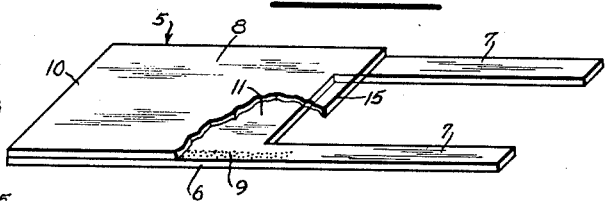
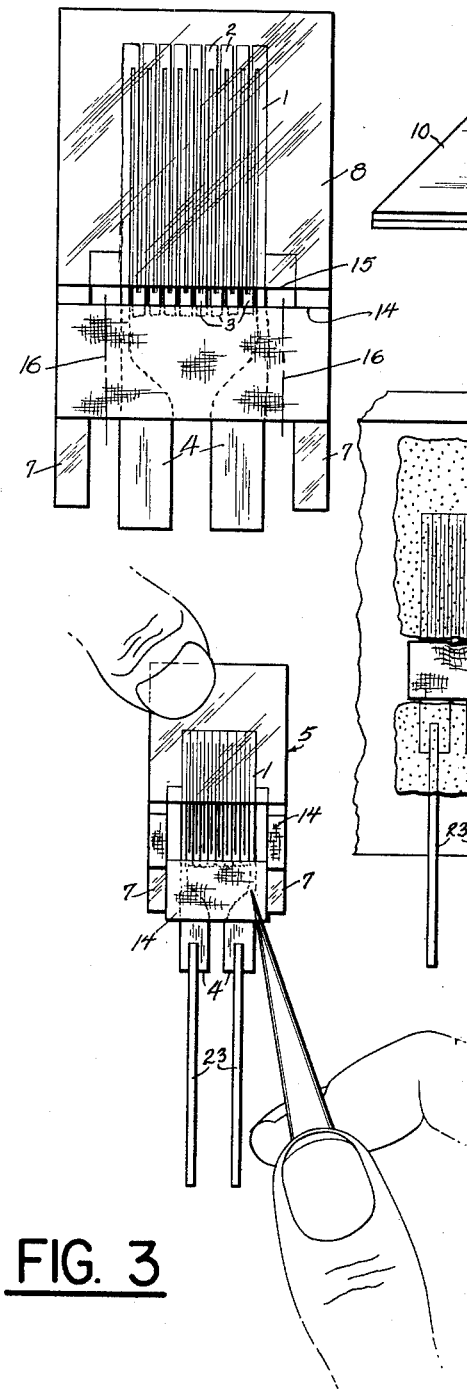
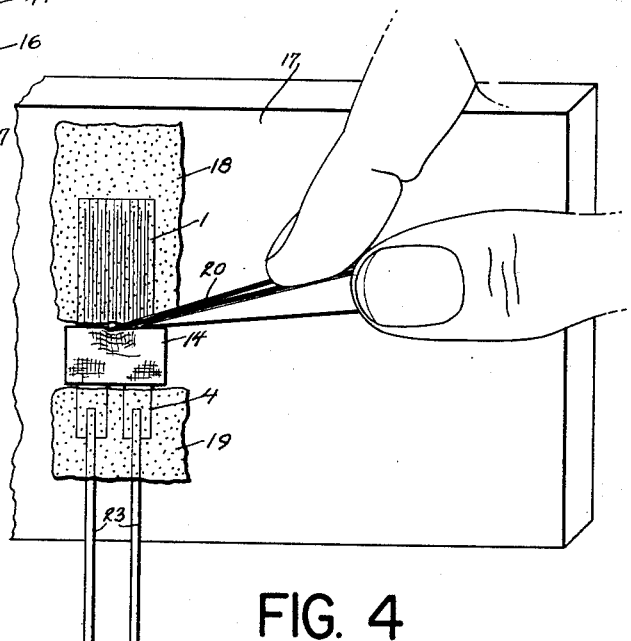
FIG. 4
FIG. 3
Leon J. Weymouth
INVENTOR
BY
ATTORNEY

United States Patent Office 3,121,491
Patented Feb. 18, 1964

3,121,491
APPARATUS FOR HANDLING FOIL TYPE
STRAIN GAGES
Leon J. Weymouth, Bedford, Mass., assignor to Baldwin-Lima-Hamilton Corporation, a corporation of Pennsylvania
Filed Apr. 7, 1961, Ser. No. 101,520
6 Claims. (Cl. 206—46)

This invention relates to an apparatus and method for handling and installing strain gages of the electrical resistance filament type especially those made of foil material for high temperature apparatus.

Foil type strain gages are most effectively employed in high temperature work by bonding the gage to a specimen test surface with a ceramic cement but to do this it is desirable to have the filaments as completely bare as possible so that their usual parallel grid formation can be effectively laid down in the ceramic cement. However, one of the difficult characteristics of foil type strain gages of grid formation, wherein the filaments have parallel portions alternately connected to provide a series connection, is that the foil is extremely thin and curls or twists around when unsupported. Various arrangements have heretofore been proposed and used in an attempt to handle the gages while they are being kept in stock prior to use or while being shipped to customers, but such prior arrangements have, in turn, introduced their own complications either in excessive manufacturing costs or in the tedious application of the gages.

It is an object of my invention to provide an improved apparatus and method for shipping gages and keeping them in stock as well as applying the gages to a test member.

Another object is to provide improved means for handling foil type strain gages that is relatively simple in construction and operation and is economical in manufacture and use as well as being quite rugged for maintaining perfect condition of the gage leading up to and during its installation.

Other objects and advantages will be more apparent to those skilled in the art from the following description of the accompanying drawings in which:

FIG. 1 is a plan view of my improved gage handling and installing apparatus with the gage shown therein as an element of the combination;

FIG. 2 is a partially broken away perspective of the gage container by itself;

FIG. 3 is a plan view of the container with its gage partially removed; and

FIG. 4 is a plan view (partially in perspective) of the gage partially installed on the surface of a test specimen and showing the final step of removing the last part of the gage handling apparatus from the gage.

In the particular embodiment of the invention disclosed herein I have shown a grid-type foil strain gage 1 which, as well known in the art, has parallel portions connected at their alternate ends by relatively wide cross-connecting grid tabs 2 and 3 so that such portions are in series terminating in relatively wide leads 4. These gages may be made in various lengths and widths, frequently quite small. The grid portion of gage is disposed in a flat pocket container generally indicated at 5. This consists of a bottom piece 6, having extended wide bars 7, and a flat overlying top piece 8 which is secured to the bottom along the side edges as at 9 and the end 10. A portion 15 of the top preferably extends slightly over the leg 7 as shown in FIG. 2, to provide a ledge on which the end of the gage may rest to facilitate insertion of the gage 1 within the pocket area 11. The material of this container is a relatively heavy, heat-sealable plastic so that the sides 9 and end 10 may be heat and pressure secured together.

During the course of manufacture of gage 1 a piece of tape 14, preferably of glass material with suitable adhesive on one side, is secured across the lead tabs 4 as well as across a small portion of the grid tabs 3 which are at the end of the grid near the leads. Light pressure is applied to the tape 14 to cause it to adhere to the tabs. The gage can then be inserted in the pocket 11 by first placing the tabs 2 which are at the other or free end of the gage on the overhanging guide ledge 15 and moving the gage inwardly to the pocket. For this operation the container 5 is turned over from the position shown in FIG. 2, thereby causing ledge 15 to be on the underside so that the gage tabs 2 can rest thereon. It will be understood that the heat sealing of the two pieces of pocket material causes a slight bowing apart of these pieces so as to provide sufficient free space to receive the gage. The opening space can be assured by the operator slightly pinching the two sides 6 toward each other to positively bow the material. After the gage is inserted the tape 14 is then adhered to the legs 7 by slightly pressing down on the tape.

The gage and its container is now ready to be shipped to a customer and the gage will maintain its perfect configuration during shipment and subseqeunt handling while in stock. The rugged character of the container insures maximum protection to the gage even though its free end is not held by any adhesive tape.

To apply the gage the tape 14 is first cut along line 16 and then the gage is pulled out of its pocket together with that remaining portion of the tape that adheres thereto. The gage is then cemented down to a test surface 17 by ceramic cement 18 and the lead tabs 4 are also cemented down as at 19. The tape 14 may then be removed by the operator placing a pair of tweezers 20 against one edge of the tab and sliding the tape lengthwise off of the gage and leads. By this sliding action there is no danger of the gage being lifted away from the test surface. After removal of the tape further ceramic cement may be applied to the exposed portions of the leads and the gage filaments.

It is seen from the foregoing disclosure that broadly a pocket is formed between pieces 6 and 8 with the piece 6 being longer, by virtue of the length of its leg portions 7, than the piece 8 in the lengthwise direction of the gage pocket. The gage leads and adjacent tabs extend beyond the pocket so that the holding tape 14 may be secured to the longer piece 6 and still be exposed for removal from such piece while holding the gage leads and adjacent tabs in their desired relative positions for subsequent installation on a specimen surface.

A further advantage of my improved apparatus is that the tape 14 holds the lead tabs 4 in a flat condition so that the customer may readily apply lead wires 23 to the tabs. This is effectively accomplished not only because the lead tabs are held flat by the tape 14 but also because a portion of the tabs are completely exposed. A further advantage of my improved construction and method of installing is that the gage may be made under controlled conditions by the manufacturer insofar as insuring that the filament will be manufactured in a perfectly flat condition without curling or entanglement of the filament portions with each other thereby insuring that the grid filament strands will be parallel and flat when inserted in pocket 11. The container and the subsequent method of removing and installing the gage insures that this manufactured quality will be carried on to the final installation. This relieves the customer of the tremendous amount of tedious time-consuming operations heretofore required in former types of gage-handling techniques and, furthermore, allows personnel of very limited training to install gages with a high degree of effectiveness.

Various changes may be made in the details of construction and method of operation without departing from the spirit of the invention as set forth in the appended claims.

I claim:

1. Apparatus for handling a foil-type electrical-resistance filament strain gage of grid formation having substantially parallel filament portions alternately connected at opposite ends by tabs and terminating in leads adjacent the tabs near one end of the grid, a tape extending across and secured to said leads and the adjacent tabs, means forming a pocket between front and back pieces of material one of which has separated legs extending from the sides of the pocket in a lengthwise direction thereof, the gage being disposed within the pocket so as to lie completely flat therein with the leads disposed between said legs, and said tape overlying said legs and being secured thereto whereby the gage is firmly held in position.

2. The combination set forth in claim 1 further characterized in that the leads have an exposed portion to which wires may be connected while the gage and leads are held by said tape within the container.

3. The combination set forth in claim 1 further characterized in that the tape is severable along lines between the legs and leads, whereby a portion of the tape remains secured to the leads and gage so as to facilitate sliding the gage out of the pocket and to hold the filament and gage in their normal relationship.

4. The combination set forth in claim 1 further characterized in that the tape is severable along lines between the legs and leads whereby a portion of the tape remains secured to the leads and gage so as to facilitate sliding the gage out of its pocket and to hold the filament and gage in their normal relationship, said tape being removable from the leads and filament tabs by sliding the tape to produce a shearing action over the surface of the leads and tabs thereby to maintain the leads and tabs in a flat condition.

5. The combination set forth in claim 1 further characterized in that one side of the pocket material extends partially over the legs to provide a shelf upon which the free end of the gage may be rested to guide the gage into the pocket.

6. Apparatus for handling a foil-type electrical-resistance filament strain gage of grid formation having substantially parallel filament portions connected at opposite ends by tabs and terminating in leads at one end of the grid, a tape extending across and secured to the tabs adjacent to the lead end of the gage, means forming a pocket between front and back pieces of material one of which is longer than the other in a lengthwise direction of the pocket, the gage being disposed within the pocket so as to lie completely flat therein with the leads extending beyond the pocket, and said tape overlying said longer piece and being secured thereto whereby the gage is firmly held in position.

References Cited in the file of this patent

UNITED STATES PATENTS

| | | |
|---|---|---|
| 2,747,731 | Bonanno | May 29, 1956 |
| 2,786,792 | Mikiska | Mar. 26, 1957 |
| 2,927,878 | Beckman | Mar. 8, 1960 |
| 2,990,949 | Roman | July 4, 1961 |